United States Patent
Takashima

(10) Patent No.: US 8,483,912 B2
(45) Date of Patent: Jul. 9, 2013

(54) CONTROL APPARATUS OF REAR-WHEEL STEERING APPARATUS

(75) Inventor: Toru Takashima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/392,718

(22) PCT Filed: Sep. 11, 2009

(86) PCT No.: PCT/JP2009/065931
§ 371 (c)(1),
(2), (4) Date: Feb. 27, 2012

(87) PCT Pub. No.: WO2011/030446
PCT Pub. Date: Mar. 17, 2011

(65) Prior Publication Data
US 2012/0158246 A1    Jun. 21, 2012

(51) Int. Cl.
*B62D 6/00* (2006.01)
*B62D 5/04* (2006.01)

(52) U.S. Cl.
USPC .......................................................... 701/41

(58) Field of Classification Search
USPC .......................................................... 701/41
See application file for complete search history.

(56) References Cited

U.S. PATENT DOCUMENTS

| | | | | |
|---|---|---|---|---|
| 5,467,278 A * | 11/1995 | Sugiyama | ........................ | 701/41 |
| 6,381,527 B1 * | 4/2002 | Furumi et al. | ................... | 701/41 |
| 2001/0013441 A1 * | 8/2001 | Furumi et al. | ................. | 180/412 |
| 2007/0265750 A1 * | 11/2007 | Goto et al. | ........................ | 701/41 |
| 2008/0115713 A1 * | 5/2008 | Mizutani | ........................ | 114/162 |
| 2008/0185212 A1 * | 8/2008 | Akuta et al. | .................... | 180/400 |
| 2010/0228442 A1 * | 9/2010 | Shoda et al. | ..................... | 701/41 |

FOREIGN PATENT DOCUMENTS

| JP | A-63-227472 | 9/1988 |
|---|---|---|
| JP | A-3-239670 | 10/1991 |
| JP | A-11-278290 | 10/1999 |
| JP | A-2001-30935 | 2/2001 |
| JP | A-2001-151134 | 6/2001 |
| JP | A-2001-187581 | 7/2001 |
| JP | A-2001-341663 | 12/2001 |
| JP | A-2003-237614 | 8/2003 |
| JP | A-2007-269070 | 10/2007 |

OTHER PUBLICATIONS

International Search Report issued in International Patent Application No. PCT/JP2009/065931 dated Dec. 15, 2009 (with translation).

* cited by examiner

*Primary Examiner* — James P. Trammell
*Assistant Examiner* — Demetra Smith-Stewart
(74) *Attorney, Agent, or Firm* — Oliff & Berridge, PLC

(57) ABSTRACT

In a vehicle provided with an ARS actuator and an ARS driving apparatus as the rear-wheel steering apparatus, an ECU performs ARS electric power saving control. In the control, electric power supply to the ARS actuator is cut under the conditions that a rudder angle deviation $\Delta\delta r$ is greater than a reference deviation $\Delta\delta th$ and that a duration Tlst exceeds a reference value Tlstth in cases where a rear-wheel rudder angle $\delta r$ is greater than a reference rudder angle $\delta rth$, wherein the rudder angle deviation $\Delta\delta r$ is a difference value between a target rear-wheel rudder angle $\delta rtg$ and the rear-wheel rudder angle $\delta r$ and the duration Tlst is a time in which the state that the rudder angle deviation $\Delta\delta r$ is greater than the reference deviation $\Delta\delta rth$ continues.

15 Claims, 3 Drawing Sheets

CONTROL APPARATUS OF REAR-WHEEL STEERING APPARATUS

TECHNICAL FIELD

The present invention relates to a control apparatus of a rear-wheel steering apparatus for controlling various rear-wheel steering apparatuses such as ARS (Active Rear Steering).

BACKGROUND ART

With regard to the rear-wheel steering apparatuses, there has been suggested a rear-wheel steering apparatus for preventing transmission of a driving force from a rear-wheel side (e.g. refer to a patent document 1). According to the vehicular rear-wheel steering apparatus disclosed in the patent document 1, it is possible to certainly prevent the steering angle of rear wheels from being changed by placing a worm gear and an irreversible clutch mechanism, which allows the transmission of a driving force to the rear-wheel side from an actuator side to prevent the transmission of the driving force in the opposite direction, in a power transmission channel for transmitting the driving force to the rear wheels from the actuator.

Incidentally, in technical fields that differ from the rear-wheel steering apparatuses, there has been also suggested an electric power steering apparatus for reducing a drive current for a motor, near a rudder angle end (e.g. refer to a patent document 2).

Patent document 1: Japanese Patent Application Laid Open No. 2003-237614

Patent document 2: Japanese Patent Application Laid Open No. 2007-269070

DISCLOSURE OF INVENTION

Subject to be Solved by the Invention

In a vehicle, a physical load for steering the rear wheels is changed in some cases due to a change in driving conditions or the like. In particular, in a rudder angle range near the end, the physical load tends to be remarkably high. In the rudder angle range in which the physical load is high in such rudder angle control, a load required for a driving device such as an actuator increases, wherein the driving device can apply to the rear wheels a steering force for promoting the steering of the rear wheels. This increases exhaustion of various storage battery devices such as a battery for supplying electric power to this actuator.

The patent document 1 does not have any description from such a viewpoint, and the exhaustion of the storage battery devices of this type cannot be suppressed. Moreover, apart from whether or not the technology described in the patent document 2 can be applied to the rear-wheel steering apparatuses, if the drive current is reduced simply near the rudder angle end as disclosed in the patent document 2, a range in which the rudder angle control can be performed is reduced from the start, and well-provided effects of the rear-wheel steering apparatuses are significantly reduced. In other words, in the conventional technology including the technologies disclosed in the patent documents described above, there is such a technical problem that it is extremely hard in practice to suppress the exhaustion of the storage battery devices while maintaining the effects of the rear-wheel steering apparatuses as much as possible.

In view of the aforementioned problems, it is therefore an object of the present invention to provide the control apparatus of the rear-wheel steering apparatus capable of suppressing the exhaustion of the storage battery device(s) while maintaining the effects of the rear-wheel steering apparatus as much as possible.

Means for Solving the Subject

The above object of the present invention can be achieved by a first control apparatus of a rear-wheel steering apparatus, the rear-wheel steering apparatus provided with: a steering force supplying device capable of supplying rear wheels of a vehicle with a steering force for promoting steering of the rear wheels in accordance with an electrification state; and an electrifying device capable of controlling the electrification state, the control apparatus comprising: a target rudder angle setting device for setting a target rudder angle of the rear wheels; an actual rudder angle specifying device for specifying an actual rudder angle of the rear wheels; and an electrification controlling device for controlling the electrifying device such that the steering force is supplied on the basis of a deviation between the set target rudder angle and the specified actual rudder angle, and for controlling the electrifying device such that electric power supply to the steering force supplying device is cut if the specified actual angle is greater than or equal to a reference rudder angle and if the deviation is greater than or equal to a reference deviation.

The first control apparatus of the rear-wheel steering apparatus of the present invention is an apparatus for controlling the rear-wheel steering apparatus of the present invention provided with the steering force supplying device and the electrifying device, and it can adopt forms of various computer systems, such as microcomputer apparatuses, various controllers, or various processing units such as a single or a plurality of ECUs (Electronic Controlled Unit), which can appropriately include various memory devices such as a buffer memory or a flash memory, a RAM (Random Access Memory) or a ROM (Read Only Memory), various processors or various controllers, one or a plurality of MPUs (Micro Processing Unit), CPUs (Central Processing Unit), etc.

The steering force supplying device of the present invention is, for example a device such as a so-called direct-acting actuator as a preferred form capable of converting rotary power of a rotating electric machine to reciprocating motion in a direction of axis regardless of whether it is performed directly or indirectly. The steering force supplying device is at least a device capable of supplying the steering force for promoting the steering of the rear wheels in accordance with the electrification state. Here, the "electrification state" means the details of various electrification aspects for the steering force supplying device, including the presence or absence of the electrification, timing of the electrification, drive voltage, drive current, driving electric power, drive duty ratio, and the like. Particularly in the present invention, the electrification state is controlled by the electrifying device. The electrifying device includes a single or a plurality of physical, mechanical, electrical, or magnetic various devices, which can appropriately include, for example a wire harness, a cable, a connector, a terminal, a switching circuit, an inverter circuit, a relay circuit, a PWM control circuit or the like, connected to the steering force supplying device under the various physical, mechanical, electrical, or magnetic aspects.

According to the control apparatus of the rear-wheel steering apparatus of the present invention, the target rudder angle setting device sets the target rudder angle of the rear wheels, and the electrification controlling device controls the electrifying device such that the proper steering force is applied to the rear wheels on the basis of the deviation between the set target rudder angle and the actual rudder angle of the rear wheels specified by the specifying device. At this time, the practical control aspect of the electrification controlling device is not limited at all as long as the deviation is used at least as one reference information in terms of control; however, as a preferred form, in order that the actual rudder angle follows the target rudder angle, various feedback control such as PID control using the deviation as a parameter or feedforward control or the like can be performed on the basis of control conditions adapted in advance.

Incidentally, the wording "specify" in the present invention conceptually includes detect, calculate, derive, identify, obtain, select and the like, and as long as it can determine the deviation as the reference information in terms of control, its practical aspect may range widely. For example, the specifying device may be a detecting device such as a rudder angle sensor, and a value corresponding to the actual ruder angle as sensor output from the detecting device such as a rudder angle sensor may be obtained as an electrical signal. Moreover, what is specified may be the actual angle or the value corresponding to the actual rudder angle whose correspondence relation with the actual rudder angle is determined in advance.

By the way, the electrification controlling device controls the steering force supplying device via the electrifying device on the basis of the deviation between the target rudder angle and the actual rudder angle. Basically, as long as there is the deviation between the target rudder angle and the actual rudder angle, the electric power supply via the electrifying device is continued.

On the other hand, the steering force necessary to steer the rear wheels increases as the actual rudder angle increases if its elements other than the actual rudder angle are common, and the steering force peaks at the rudder angle end and in a rudder angle area in the vicinity of the rudder angle end in many cases. In such a relatively large rudder angle area, the steering force for making the actual rudder angle follow the target rudder angle exceeds physical, mechanical, or electrical various restrictions or limits of the steering force supplying device in many cases.

In this case, even if the electrification continues, there can be such a situation that the deviation between the actual rudder angle and the target rudder angle is not reduced at least to a practically useful extent. In other words, in such a situation, waste of electric power resources which hardly contributes to the attainment of the target rudder angle can be continually generated. The waste of electric power resources can be disadvantage over practical advantage of the rudder angle control of the rear wheels.

Thus, in the control apparatus of the rear-wheel steering apparatus of the present invention, the electrification controlling device controls the electrifying device such that the electric power supply to the steering force supplying device is cut if the specified actual angle is greater than or equal to the reference rudder angle and if the deviation is greater than or equal to the reference deviation.

At this time, the practical aspect in cutting the electric power supply is not particularly limited as long as the electric power consumption of the steering force supplying device is not actualized (i.e. the electric power consumption is not necessarily zero). The electric connection of a battery or the like with various storage battery devices may be cut by a relay circuit or the like. The electric power supply may be substantially cut by the action of the control, such as setting a drive duty ratio to be zero.

The "deviation between the target rudder angle and the actual rudder angle" in the present invention is a value obtained by subtracting the actual rudder angle from the target rudder angle. The expression "that the deviation is greater than or equal to the reference deviation" means, namely, that the actual rudder angle is insufficient by the reference deviation or more with respect to the target rudder angle. Incidentally, in the practical control aspect, positive and negative (plus and minus) signs may be given depending on the steering direction of the rear wheels. In this case, strictly speaking, the magnitude correlation between the target rudder angle and the actual rudder angle can be reversed. Of course, in such a case or in similar cases, a judgment is made in view of the aforementioned purpose.

Here, the "reference deviation", which is a criterion value associated with the deviation, is preferably a fixed or variable value which can be determined in mutual, cooperative consideration of an effect of suppressing the waste of electric power and actual advantage by the rear-wheel steering (which can contradict each other), on the basis of experiments, experiences, theories, simulations or the like in advance.

Incidentally, if the reference deviation is excessively small, the electric power supply can be cut even if a particular load is not added to the steering force supplying device. On the other hand, if the reference deviation is excessively large, the control indicative of the cut of the electric power supply is not put into action at practically useful frequency. Therefore, the reference deviation is desirably set to accurately determine the state that there is a type of saturation in the actual angle due to the fact that the steering force required for the steering of the rear wheels is excessive in view of current restrictions or the like on the operations of the steering force supplying device, when the actual angle is made follow the target rudder angle.

Moreover, the "reference rudder angle", which is a criterion value associated with the actual rudder angle, is preferably a fixed or variable value which is set in view of the point that the large or small ruder angle corresponds to the large or small load of the steering force supplying device, respectively, as described above. For example, the reference rudder angle may be a relatively large value near the rudder angle end. Further to that, in a relatively small ruder angle area which is less than the reference rudder angle, even if there is a steady-state deviation for some reasons, the load of the steering force supplying device does not increase, and the waste of electric power is hardly actualized to the extent that it is practically a problem.

However, the vehicle is equipped with various electric auxiliary equipment requiring the electric power supply for the drive, and the amount of electric power which can be supplied to the steering force supplying device can be influenced by the operating state of the electric auxiliary equipment to a greater or lesser extent. Even if the amount of the electric power supplied to the steering force supplying device is restricted for such reasons, it is possibly hard to achieve the target rudder angle in the same manner. Particularly in this case, the storage battery device such as a battery is in a relatively high load state, and the electric power supply to the steering force supplying device influences the storage battery, relatively significantly. Therefore, the reference rudder angle is not necessarily limited to the value near the rudder angle end, and it may be a variable value depending on the state of the storage battery device at that time point, Incidentally, the electrification controlling device may add a time element to a judgment element in judging whether or not the electric power supply is cut. For example, if the deviation does not change over a constant or irregular time range (i.e. if there is the so-called steady-state deviation), such measures as comparing the deviation with the reference deviation may be taken.

As described above, according to the control apparatus of the rear-wheel steering apparatus of the present invention, wasteful electric power consumption, which can take place if the actual rudder angle has the excessive steady-state deviation with respect to the target rudder angle, is avoided. In other words, as long as the rear-wheel steering apparatus can exert its effects practically sufficiently, the electric power consumption is not cut. It is possible to effectively suppress the exhaustion of the storage battery device while maintaining the effects of the rear-wheel steering apparatus as much as possible.

In one aspect of the first control apparatus of the rear-wheel steering apparatus of the present invention, the steering force supplying device is an actuator in which backward efficiency is less than forward efficiency.

If the backward efficiency is greater than or equal to the forward efficiency, the actuator is possibly driven by a reverse driving force inputted from the rear wheels in accordance with a road-surface input, and the control of cutting the electric power supply associated with the electrification controlling device is possibly not a little blocked. However, according to the configuration that the actuator in which the backward efficiency is less than the forward efficiency and desirably less than or equal to zero is provided as the steering force supplying device, there is no aforementioned concern. Thus, it is extremely useful in practice in saving the electric power consumption associated with the rear-wheel steering.

In another aspect of the first control apparatus of the rear-wheel steering apparatus of the present invention, the electrification controlling device restarts the electric power supply if the deviation is less than a predetermined deviation for return in a state that the electric power supply is cut.

According to this aspect, in the state that the electric power supply is cut, for example in the course that the target rudder angle is reset, if the target rudder angle is changed to the reduction side (i.e. neutral side) and the deviation between the target rudder angle and the actual rudder angle is less than the deviation for return (it is not excluded that the deviation for return has the same value as that of the reference deviation; however, preferably, the deviation for return is a value set in an area less than the reference deviation from the implications that hysteresis is provided for the control or from similar implications), it is possible to restart the electric power supply, quickly. Therefore, it is possible to maintain the rear-wheel steering apparatus in an operating state as much as possible while preventing that the excess load is applied to the storage battery device. Thus, it is practically useful.

Incidentally, the deviation for return may be zero. In this case, the state that the deviation is less than the deviation for return means, namely, the state that the target rudder angle is less than the actual rudder angle, and it is equivalent to the state that the target rudder angle goes across the actual rudder angle (i.e. the state that the control direction of the actual rudder angle is reversed to the side that the actual rudder angle decreases transitionally or temporarily). As described above, if it is set as the restart condition of the electric power supply that the target rudder angle changes to less than the actual angle, it is possible to certainly prevent that the excess load is applied to the storage battery device immediately after restart, due to the fact that the control direction of the rudder angle is on the neutral side having a light load. Thus, it is effective as safety precautions.

The above object of the present invention can be also achieved by a second control apparatus of a rear-wheel steering apparatus, the rear-wheel steering apparatus provided with a steering force supplying device capable of supplying rear wheels of a vehicle with a steering force for promoting steering of the rear wheels in accordance with an electrification state; and an electrifying device capable of controlling the electrification state, the control apparatus provided with a target rudder angle setting device for setting a target rudder angle of the rear wheels; an actual rudder angle specifying device for specifying an actual rudder angle of the rear wheels; an electrification controlling device for controlling the electrifying device such that the steering force is supplied on the basis of a deviation between the set target rudder angle and the specified actual rudder angle; and an actual rudder angle setting device for setting the set target rudder angle as an actual rudder angle for defining the deviation if the specified rudder angle is greater than or equal to a reference rudder angle and if the deviation is greater than or equal to a reference deviation.

According to the second control apparatus of the rear-wheel steering apparatus of the present invention, as opposed to the first control apparatus of the rear-wheel steering apparatus, if the specified rudder angle is greater than or equal to the reference rudder angle and if the deviation is greater than or equal to the reference deviation, the target rudder angle at that time point is set as the actual rudder angle for defining the deviation by the actual rudder angle setting device. In other words, according to the second control apparatus of the rear-wheel steering apparatus of the present invention, the deviation between the target rudder angle and the actual rudder angle is namely the deviation between the target rudder angles and the actual rudder angle is zero (incidentally, since the target rudder angle is replaced as the actual rudder angle for defining the deviation, the replaced actual rudder angle is used instead of the specified actual rudder angle in determining the deviation).

Thus, as an actual phenomenon, even if the rudder angle of the rear wheels does not follow the target rudder angle, the rudder angle of the rear wheels is treated as if it followed the target rudder angle in terms of the control. Therefore, the electric power taken out from the electrifying device (i.e. the steering force supplied from the steering force supplying device) is a small value corresponding to that in target convergence. Thus, it is possible to preferably avoid the waste of electric power resources.

The above object of the present invention can be also achieved by a third control apparatus of a rear-wheel steering apparatus, the rear-wheel steering apparatus provided with: a steering force supplying device capable of supplying rear wheels of a vehicle with a steering force for promoting steering of the rear wheels in accordance with an electrification state; and an electrifying device capable of controlling the electrification state, the control apparatus provided with: a target rudder angle setting device for setting a target rudder angle of the rear wheels; an actual rudder angle specifying device for specifying an actual rudder angle of the rear wheels; an electrification controlling device for controlling the electrifying device such that the steering force is supplied on the basis of a deviation between the set target rudder angle and the specified actual rudder angle; and an offset angle setting device for setting an offset angle to be added to the specified actual rudder angle in accordance with the deviation if the specified rudder angle is greater than or equal to a reference rudder angle and if the deviation is greater than or equal to a reference deviation, the electrifying device controlling the electrifying device on the basis of the set target rudder angle and a modified rudder angle obtained by adding the set offset angle to the specified actual rudder angle.

The third control apparatus of the rear-wheel steering apparatus of the present invention is similar to the aforementioned second control apparatus of the rear-wheel steering apparatus. If the actual rudder angle is greater than or equal to the reference rudder angle and if the deviation is greater than the reference deviation, the offset angle to be added to the actual rudder angle specified by the specifying device is set in accordance with the deviation by the offset angle setting device. In other words, as its effects, as in the aforementioned second control apparatus of the rear-wheel steering apparatus, the deviation between the target rudder angle and the specified actual rudder angle is eliminated in terms of control. Therefore, as in the second control apparatus of the rear-wheel steering apparatus, the waste of electric power resources is preferably avoided.

In one aspect of the second or third control apparatus of the rear-wheel steering apparatus of the present invention, it is further provided with a reference deviation setting device for setting the reference deviation in accordance with predetermined quantity of state of the vehicle.

According to this aspect, the reference deviation is set in accordance with the quantity of state of the vehicle by the reference deviation setting device. Here, the "quantity of state of the vehicle" is quantity of state in which a correspondence relation with the load of the steering force supplying device is defined on the basis of experiments, experiences, theories, simulations or the like in advance. By setting the reference deviation in accordance with this type of quantity of state, it is possible to judge whether or not there is the waste of electric power resources, more highly accurately.

Incidentally, in this aspect, the predetermined quantity of state of the vehicle may include at least one of a speed of the vehicle, the actual rudder angle of the rear wheels, and lateral acceleration of the vehicle.

The load required for the steering of the rear wheels decreases as the vehicle speed increases, increases as the actual rudder angle increases, and increases as the lateral acceleration increases. In other words, they are preferable as the quantity of state of the vehicle, and if the reference deviation is set in view of them, it is possible to judge whether or not electric power resources are wasted, more highly accurately.

In another aspect of the third control apparatus of the rear-wheel steering apparatus of the present invention, the offset angle setting device increases the offset angle in accordance with amount of an increase if the set target rudder angle increases.

According to this aspect, if the target rudder angle of the rear wheels increases (i.e. which corresponds to cutting or steering more to the rudder angle end side), the offset angle is corrected to the increase side in accordance with the amount of the increase. Thus, it is possible to certainly suppress the waste of electric power resources.

In another aspect of the third control apparatus of the rear wheel steering apparatus of the present invention, the offset angle setting device reduces the offset angle in accordance with amount of an increase if the set target rudder angle increases.

According to this aspect, if the target rudder angle of the rear wheels increases (i.e. which corresponds to cutting or steering more to the rudder angle end side), the offset angle is reduced in accordance with the quantity of state of the vehicle. Depending on the quantity of state of the vehicle (which can preferably include, for example, the vehicle speed, the rudder angle, the lateral acceleration and the like, described above), the load required for the steering of the rear wheels is reduced in some cases. In this case, there is no waste of electric power resources, and the actual rudder angle can be further made to follow the target rudder angle. Therefore, as described above, by correcting the offset angle to the reduction side, it is possible to receive the practical advantage associated with the rear-wheel steering as much as possible.

In another aspect of the third control apparatus of the rear-wheel steering apparatus of the present invention, the offset angle setting device reduces the set offset angle if the set target rudder angle is less than the specified actual rudder angle.

According to this aspect, if the target rudder angle is less than the specified actual rudder angle (i.e. which corresponds to a case where the target rudder angle goes across the actual rudder angle in a direction opposite to the rudder angle end direction), the set offset angle is corrected to the reduction side. Moreover, as a desirable aspect, the offset angle is set to be zero. Thus, it is possible to eliminate the restrictions imposed on the rear-wheel steering apparatus from the viewpoint of avoiding the waste of electric power resources, as early as possible, and it is possible to maximally receive the practical advantage associated with the rear-wheel steering apparatus.

In another aspect of the first, second, or third control apparatus of the rear-wheel steering apparatus of the present invention, the target rudder angle setting device sets the target rudder angle on the basis of predetermined quantity of state of the vehicle or a driver's steering amount.

According to this aspect, since the target rudder angle is set on the basis of the various quantities of state of the vehicle as described above or various driver steering amounts, such as a steering torque, a steering angle, or a steering angular velocity, the target rudder angle can be set accurately, and the effects of the rear-wheel steering apparatus can be optimized. In the configuration that enables the rear-wheel steering apparatus to be optimally driven in this way, namely together with the practical advantage associated with the avoidance of the waste of electric power resources, an extremely desirable effect is exerted.

The operation and other advantages of the present invention will become more apparent from the embodiments explained below.

DESCRIPTION OF REFERENCE CODES

Figure 1:
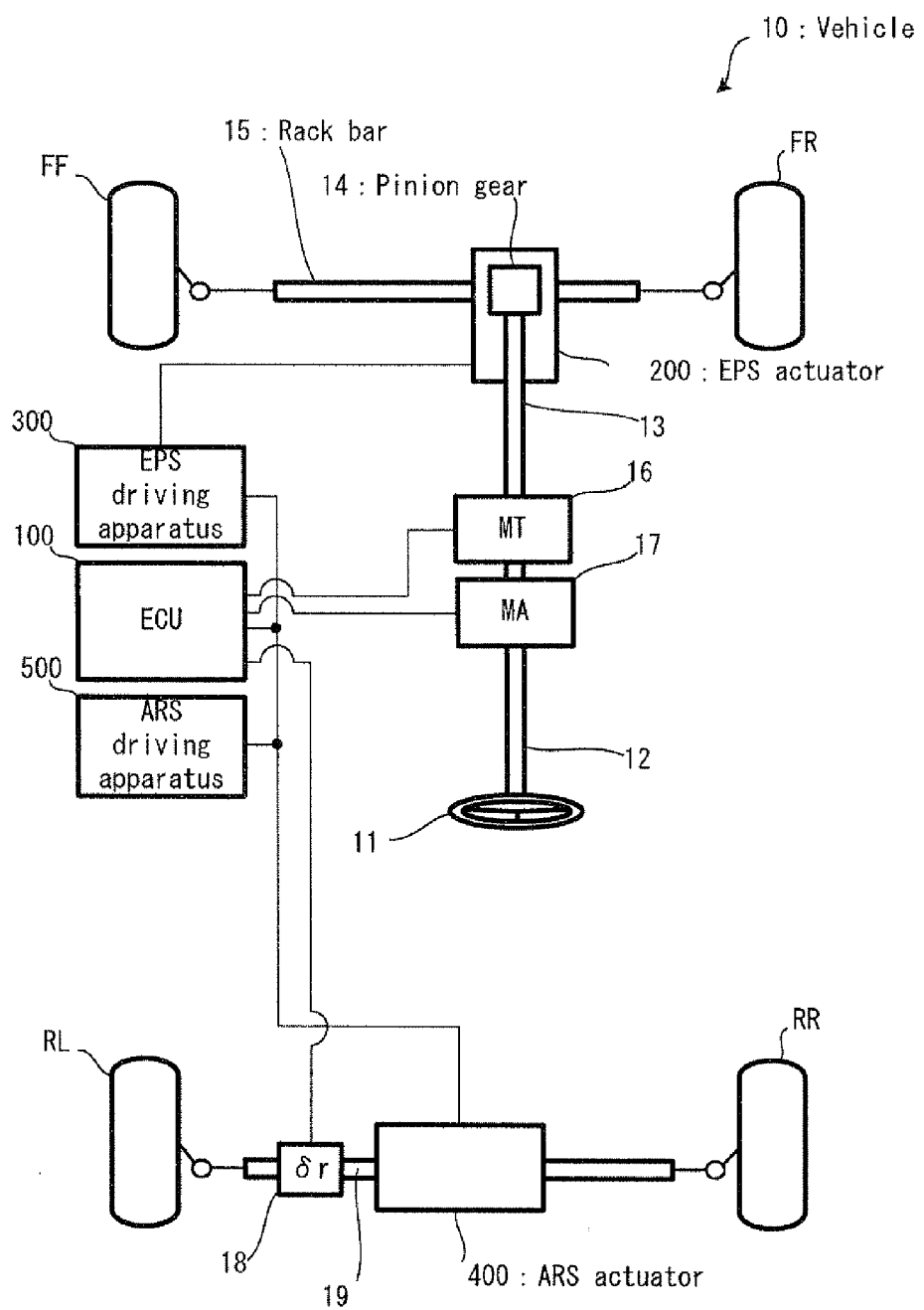
FIG. 1 is a schematic configuration diagram conceptually showing the structure of a vehicle in a first embodiment of the present invention.

FL, FR wheel
10 vehicle
11 steering wheel
12 upper steering shaft
13 lower steering shaft
14 pinion gear
16 steering angle sensor
17 steering torque sensor
18 rudder angle sensor
100 ECU
200 EPS actuator
300 EPS driving apparatus 400 ARS actuator
410 rear steering rod
500 ARS driving apparatus Best Mode For Carrying Out The Invention Hereinafter, various embodiments of the control apparatus of the rear-wheel driving apparatus in the present invention will be explained with reference to the drawings as occasion demands.

<First Embodiment>
<Structure of Embodiment>

Firstly, with reference to FIG. 1, the structure of a vehicle 10 in a first embodiment of the present invention will be explained. FIG. 1 is a schematic configuration diagram conceptually showing the basic structure of the vehicle 10.

In FIG. 1, the vehicle 10 is provided with a pair of front wheels FL and FR on either sides as steered wheels, and it is configured to move in a desired direction by steering the front wheels. Moreover, in the vehicle 10, a pair of rear wheels RL and RR on either sides are also steered wheels. By steering the rear wheels, a turning operation of the vehicle is assisted or the behavior of the vehicle is stabilized. The vehicle 10 is provided with an ECU 100, an EPS actuator 200, an EPS driving apparatus 300, an ARS actuator 400 and an ARS driving apparatus 500, and it is one example of the "vehicle" of the present invention.

The ECU 100 is provided with a CPU, a ROM and a RAM, each of which is not illustrated, and it is an electronic control unit capable of controlling all the operations of the vehicle 10. The ECU 100 is one example of the "control apparatus of the rear-wheel steering apparatus" of the present invention. The ECU 100 is configured to perform ARS control described later, in accordance with a control program stored in the ROM.

Incidentally, the ECU 100 is a unified or one-body electronic control unit, configured to function as one example of each of the "target rudder angle setting device", the "actual ruder angle specifying device", and the "electrification controlling device" of the present invention. The operations of each of the devices are all performed by the ECU 100. However, the physical, mechanical and electrical configurations of each of the devices of the present invention are not limited to this, and each of the devices may be configured as various computer systems, such as a plurality of ECUs, various processing units, various controllers, or micro computer apparatuses.

In the vehicle 10, a steering input (i.e. one example of the "driver steering amount" of the present invention) given by a driver via a steering wheel 11 is transmitted to an upper steering shaft 12, as a shaft which is coaxially rotatably coupled with the steering wheel 11 and which can rotate in the same direction as that of the steering wheel 11. The upper steering shaft 12 is coupled with a lower steering shaft 13 via a steering torque sensor 16 at the end of the upper steering shaft 12 on the downstream side.

The steering torque sensor 16 is a sensor capable of detecting a driver steering torque MT given via the steering wheel 11 by the driver. The upper steering shaft 12 has such a structure that it is coupled with the lower steering shaft 13 by a not-illustrated torsion bar. To the both ends on the upstream side and the downstream side of the torsion bar, rings for detecting a rotational phase difference are fixed. The torsion bar is twisted in its rotational direction in accordance with a steering torque (i.e. driver steering torque MT) transmitted via the upstream part of the upper steering shaft 12 when the driver of the vehicle 10 operates the steering wheel 11, and the torsion bar can transmit the steering torque to the downstream part while generating the twist or torsion. Therefore, in the transmission of the steering torque, there is the rotational phase difference between the rings for detecting the rotational phase difference described above. The steering torque sensor 16 can detect the rotational phase difference, convert the rotational phase difference to the steering torque, and output it as an electrical signal corresponding to the steering torque MT. Moreover, the steering torque sensor 16 is electrically connected to the ECU 100, and the detected steering torque MT is referred to by the ECU 100 with a constant or irregular period.

A steering angle sensor 17 is an angle sensor capable of detecting a steering angle MA which indicates the amount of rotation of the upper steering shaft 12. The steering angle sensor 17 is electrically connected to the ECU 100, and the detected steering angle MA is referred to by the ECU 100 with a constant or irregular period.

The rotation of the lower steering shaft 13 is transmitted to a rack and pinion mechanism. The rack and pinion mechanism is a steering force transmission mechanism including: a pinion gear 14 connected to the downstream side end of the lower steering shaft 13; and a rack bar 15 in which there are formed gear teeth which engage with the gear teeth of the pinion gear 14. By converting the rotation of the pinion gear 14 to horizontal motion of the rack bar 15 in FIG. 1, a steering force is transmitted to each of the steered wheels via tie rods and knuckles (whose reference numerals are omitted) coupled with the both ends of the rack bar 15. In other words, in the vehicle 10, a so-called rack and pinion type steering method is realized.

The EPS actuator 200 is provided with an EPS motor as a DC brushless motor including a not-illustrated rotor as a rotator to which a permanent magnet is attached and a stator as a stationary part which surrounds the rotor. The EPS motor can generate an assist torque TA in the direction of rotation of the rotor, which is rotated by the action of a rotating magnetic field formed in the EPS motor due to the electrification to the stator via the EPS driving apparatus 500.

On the other hand, to a motor shaft as a rotating shaft of the EPS motor, a not-illustrated reduction gear is fixed. The reduction gear also engages with the pinion gear 14. Thus, the assist torque TA coming from the EPS motor functions as an assist torque for assisting the rotation of the pinion gear 14. The pinion gear 14 is coupled with the lower steering shaft 13 as described above, and the lower steering shaft 13 is coupled with the upper steering shaft 12. Therefore, the driver steering torque MT applied to the upper steering shaft 12 is transmitted to the rack bar 15 in the form that it is assisted by the assist torque TA, as occasion demands, by which the driver's steering load is reduced.

The EPS driving apparatus 300 is an electric drive circuit, including a PWM circuit, a transistor circuit, an inverter, and the like, capable of electrifying the stator of the EPS motor. The EPS driving apparatus 300 is electrically connected to a not-illustrated battery, and it can supply a driving voltage to the EPS motor by using electric power supplied from the battery. Moreover, the EPS driving apparatus 300 is electrically connected to the ECU 100, and its operation is controlled by the ECU 100.

The ARS actuator 400 is a known direct-acting actuator having: an ARS motor as a DC brushless motor including a not-illustrated rotor as a rotator to which a permanent magnet is attached and a stator as a stationary part which surrounds the rotor; and a conversion mechanism for converting rotary motion of the ARS motor to linear motion in the horizontal direction in FIG. 1. The ARS actuator 400 is one example of the "steering force supplying device" of the present invention. The ARS motor can generate torque in the direction of rotation of the rotor, which is rotated by the action of a rotating magnetic field formed in the ARS motor due to the electrification to the stator via the ARS driving apparatus 500.

Here, the ARS actuator 400 is connected to a rear steering rod 19. The rear steering rod 19 can be driven in the horizontal direction in FIG. 1 in accordance with a steering force in the horizontal direction in FIG. 1 resulting from the conversion of the rotary motion of the ARS motor to the linear motion. The rear steering rod 19 is coupled with the right and left rear wheels on its both ends via knuckles or the like. Therefore, by virtue of the ARS actuator 400, the rudder angle of the rear wheel RL and the rear wheel RR varies in a rudder angle range of δrmax to −δrmax (incidentally, positive and negative (or plus and minus) signs are given for convenience of control, and they mean a right steering direction or a left steering direction).

In the rear steering rod 19, a rudder angle sensor 18 capable of detecting a rear-wheel rudder angle δr as the rudder angle of each rear wheel (incidentally, δr is equal between right and left) is laid. The rudder angle sensor 18 is electrically connected to the ECU 100, and the detected rear-wheel rudder angle δr is referred to by the ECU 100 with a constant or irregular period.

Incidentally, in the ARS actuator 400, backward efficiency (i.e. efficiency of the ARS actuator being driven by the supply of a reverse power to the ARS actuator 400 from each rear wheel) is less than forward efficiency (i.e. efficiency of each rear wheel being driven by the normal power supply to each rear wheel from the ARS actuator 400) and is less than or equal to zero. Therefore, the ARS actuator 400 basically is not driven by the input of the power from the rear wheels, such as a road surface disturbance, a road surface input, or a road surface friction.

The ARS driving apparatus 500 is an electric drive circuit, including a PWM circuit, a transistor circuit, an inverter, and the like, capable of electrifying the stator of the ARS motor. The ARS driving apparatus 500 is one example of the "electrifying device" of the present invention. The ARS driving apparatus 500 is electrically connected to a not-illustrated battery, and it can supply a driving current Mars to the ARS motor by using electric power supplied from the battery. Moreover, the ARS driving apparatus 500 is electrically connected to the ECU 100, and its operation is controlled by the ECU 100. As described above, in the vehicle 10 in the embodiment, the ARS actuator 400 and the ARS driving apparatus 500 constitute one example of the "rear wheel driving apparatus" of the present invention.

<Operations in Embodiment>
<Control of ARS Actuator 400>

In the vehicle 10, the operating state of the ARS actuator 400 is controlled by the ECU 100. The ECU 100 firstly sets a target rear-wheel rudder angle δrtg (i.e. one example of the "target rudder angle of the rear wheels" of the present invention) which is a target value of the rear-wheel rudder angle, on the basis of the steering angle MA detected by the steering angle sensor 17 and a vehicle speed V as the speed of the vehicle 10. At this time, the ECU 100 refers to a target rear-wheel rudder angle map with the steering angle MA and the vehicle speed V as parameters, stored in the ROM in advance. In the target rear-wheel rudder angle map, one target rear-wheel rudder angle δrtg is associated with the parameters, and the ECU 100 selectively obtains the target rear-wheel rudder angle δrtg corresponding to the steering angle MA and the vehicle speed V at that time point.

Incidentally, this is not shown in FIG. 1, but the vehicle 10 is equipped with various sensors required in controlling the behavior of the vehicle. The vehicle speed V is detected by a vehicle speed sensor, which is one of the various sensors. The vehicle speed sensor is electrically connected to the ECU 100, and the detected vehicle speed V is referred to by the ECU 100 with a constant or irregular period. Moreover, in the same manner, the vehicle 10 is provided with a lateral acceleration sensor capable of detecting lateral acceleration Gy of the vehicle 10.

If setting the target rear-wheel rudder angle δrtg, the ECU 100 controls the ARS driving apparatus 500 in a form of feeding back a rudder angle deviation Δδr obtained by subtracting the rear-wheel rudder angle Sr detected by the rudder angle sensor 18 from the set target rear-wheel rudder angle δrtg (i.e. one example of the "deviation between the set target rudder angle and the specified actual rudder angle" of the present invention). The drive current Idars is supplied from the ARS driving apparatus 500, by which the ARS motor of the ARS actuator 400 is driven, and the steering force for promoting the steering of the rear wheels RL and RR is supplied to the rear wheels RL and RR via the rear steering rod 19, and then each rear wheel is driven.

<Details of ARS Electric Power Saving Control>

Figure 2:
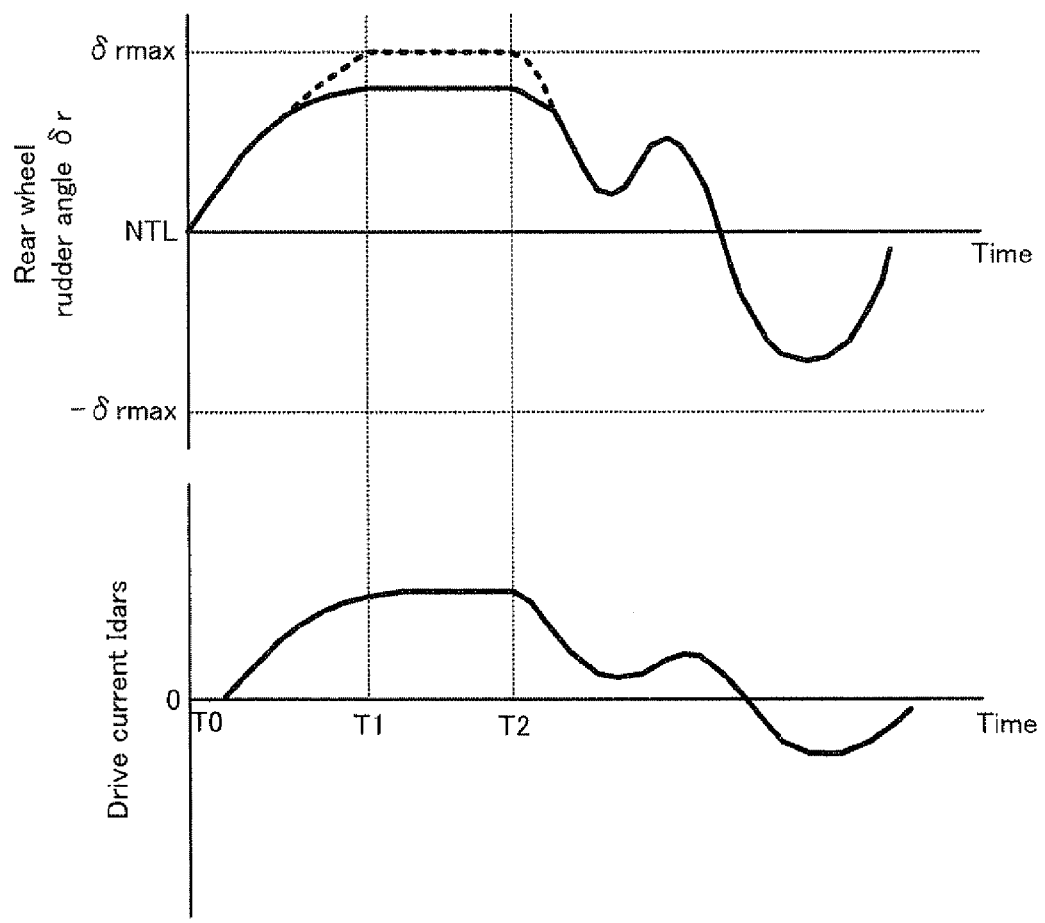
FIG. 2 is a schematic characteristic diagram illustrating a temporal transition in a rear-wheel rudder angle and an ARS drive current in the vehicle in FIG. 1.

Next, with reference to FIG. 2, an explanation will be given on problems in actual control in the configuration that the ARS actuator 400 and the ARS driving apparatus 500 are provided. FIG. 2 is a schematic characteristic diagram illustrating a temporal transition in the rear-wheel rudder angle Sr and the ARS drive current Idars.

In FIG. 2, the temporal transition of the rear-wheel rudder angle Sr is shown in the upper part, and the temporal transition of the drive current Idars of the ARS actuator 400 is shown in the lower part, in a solid line in each case. Here, it is assumed that the control of the rear-wheel rudder angle δr is started at a time point T0 and that the rear-wheel rudder angle δr changes to follow the target rear-wheel rudder angle Srtg in one steering direction from a neutral position NTL (refer to a dashed line in FIG. 2, and it substantially agrees with an actual rudder angle Sr in a transitional period after the time point T0).

However, the steering force required for the steering of the rear wheels changes depending on driving conditions of the vehicle 10. Thus, according to circumstances, the ARS actuator 400 exceeds its corresponding load range in some cases. In such a load range, the rudder angle deviation Δδr, which is the deviation between the target rear-wheel rudder angle δrtg and the rear-wheel rudder angle δr, is not eliminated but remains as a steady-state deviation. FIG. 2 shows this situation, and such a phenomenon is seen in a time area from a time point T1 to a time point T2.

On the other hand, the drive current Idars is determined basically in accordance with the rudder angle deviation Δδr. Thus, in the state that the rudder angle deviation Δδr remains as the steady-state deviation, the value of the drive current Idars is large. However, no matter how much electric power is taken out from the battery via the ARS driving apparatus 500, the rudder angle deviation Δδr does not change any more in the state that the load required for the steering of the rear wheels exceeds the physical or electrical limit of the ARS actuator 400. This can result in considerable waste of electric power resources in comparison with the actual effects of the ARS actuator 400. In the embodiment, such waste of electric power resources preferably is avoided by the ARS electric power saving control.

Figure 3:
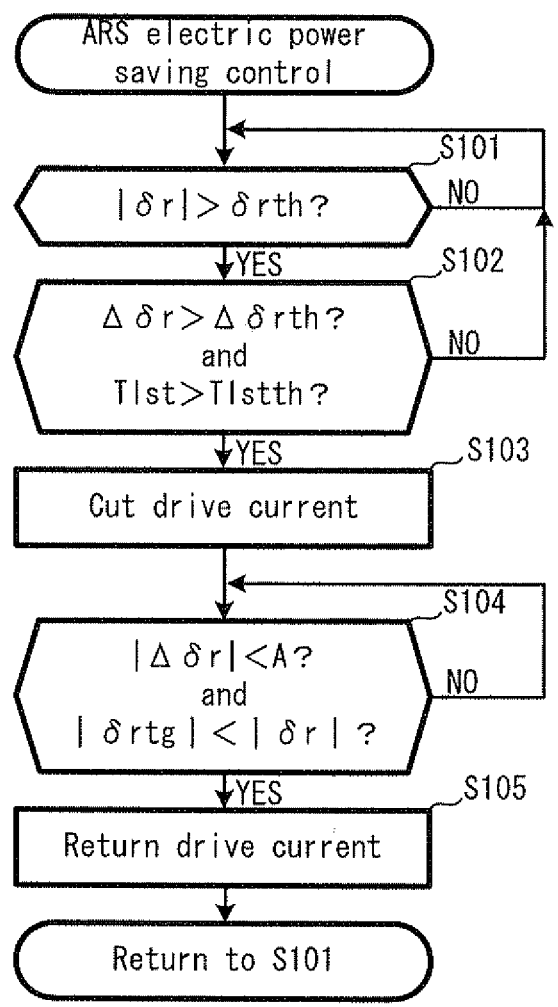
FIG. 3 is a flowchart showing basic control performed in the vehicle in FIG. 1.

Now, with reference to FIG. 3, the details of the ARS electric power saving control will be explained. FIG. 3 is a flowchart showing the ARS electric power saving control.

In FIG. 3, the ECU 100 judges whether or not the rear-wheel rudder angle δr is greater than a reference rudder angle δrth (step S101). Incidentally, in FIG. 3, the absolute value of the rear-wheel rudder angle δr is used; however, this merely takes into account that the positive and negative (plus and minus) signs are given in terms of control, and there is basically neither positive area nor negative area in the steering direction. Thus, conceptually, the rear-wheel rudder angle δr may only be compared with the reference rudder angle δrth. Here, the reference rudder angle δrth defined for the rear-wheel rudder angle δr is a preset value set almost in the vicinity of the rudder angle end (i.e. the aforementioned δrmax).

If the rear-wheel rudder angle Δδr is less than or equal to the reference rudder angle Δδrth (the step S101: NO), the ECU 100 performs the step S101 with a constant period and substantially makes the process on standby. On the other hand, if the rear-wheel rudder angle δr is greater than the reference rudder angle Δδrth (the step S101: YES), the ECU 100 further judges whether or not the rudder angle deviation Δδr is greater than a reference deviation Δδrth, and whether or not a duration Tlst exceeds a reference value Tlstth, wherein the duration Tlst is a value of time in which the state that the rudder angle deviation Δδr is greater than the reference deviation Δδrth continues (step S102).

The measurement of the duration Tlst is started by a built-in timer from a time point at which the rudder angle deviation Δδr firstly exceeds the reference deviation Δδrth. As long as the state that the rudder angle deviation Ayr exceeds the reference deviation Δδrth continues, it is cumulatively counted.

If the rudder angle deviation Δδr is less than or equal to the reference deviation Δδrth, or even if the rudder angle deviation Δδr is greater than the reference deviation Δδrth, if the duration Tlst still does not exceed the reference value Tlstth (the step S102: NO), the ECU 100 returns the process to the step S101 and repeats a series of the processes.

On the other hand, if the rudder angle deviation Δδr is greater than the reference deviation Δδrth, and if that state continues over a period of time longer than the reference value Tlstth (the step S102: YES), i.e. if it is judged that the rudder angle deviation Δδr is a steady-state deviation which can cause the waste of electric power resources, the ECU 100 controls the ARS driving apparatus 500 and cuts the supply of the drive current Idars to the ARS actuator 400 (step S103).

If cutting the supply of the drive current Idars, the ECU 100 judges whether or not the rudder angle deviation Δδr is less than a threshold value A and whether or not the target rear-wheel rudder angle δrtg is less than the rear-wheel rudder angle δr; namely, after the target rear-wheel rudder angle δrtg changes in a direction (i.e. neutral direction) opposite to the rudder angle end direction and goes across the rear-wheel rudder angle δr, the ECU 100 judges whether or not the rudder angle deviation Δδr is less than the threshold value A (step S104).

If the rudder angle deviation Δδr is greater than or equal to the threshold value A or if the target rear-wheel rudder angle δrtg is greater than or equal to the rear-wheel rudder angle δr (the step S104: NO), the ECU 100 continues the cut of the drive current, and if the rudder angle deviation Δδr is less than the threshold value A and if the target rear-wheel rudder angle δrtg is less than the rear-wheel rudder angle δr (the step S104: YES), the ECU 100 restarts the supply of the drive current Idars (step S105). If the step S105 is performed, the process is returned to the step S101, and a series of the processes is repeated. The ARS electric power saving control is performed as described above.

Incidentally, in the step S104, regarding permission of the drive current return, mutually different two types of judgment conditions are provided. The latter judgment condition, i.e. whether or not the target rear-wheel rudder angle δrtg is less than the rear-wheel rudder angle δr, is exactly whether or not the rudder angle deviation Δδr is less than zero. Therefore, this zero and the threshold value A are both value that can function as one example of the "deviation for return" of the present invention. Even if only either one of them is used, the same advantage can be received.

However, if the both are used as a combined condition as in the embodiment, basically, it is possible to prevent the restart of the supply of the drive current, for example in cases where the amount of a time change in the target rear-wheel rudder angle δrtg is excessively large and the load required for the ARS actuator 400 is not reduced, or in similar cases, while the supply of the electric power is restarted if the target rear-wheel rudder angle δrtg is less than the actual rudder angle δr. This is effective as safety precautions.

As described above, according to the ARS electric power saving control in the embodiment, if the load required for the ARS actuator 400 is high to the extent that the rudder angle deviation Δδr cannot be reduced, the supply of the drive current Idars to the ARS actuator 400 is cut.

Here, in particular, the ARS actuator 400 is an actuator with a backward efficiency of zero or less. In the state that the supply of the drive current Idars is cut, the rear-wheel rudder angle δr does not return to the neutral position NTL (preferably, δr=0) due to a reverse input from the rear wheels as the steered wheels. Thus, in exchange for the effects of the electric power saving, the advantage of the rear-wheel steering provided by the ARS actuator 400 is not avoided. While the effects of the rear-wheel steering are maintained as much as possible, the effective use of finite electric power resources accumulated in the battery is realized.

Incidentally, the reference deviation Δδrth referred to in the step S102 may be a fixed value adapted experimentally, or may be a variable value set at each time on the basis of the vehicle speed V, the lateral acceleration Gy and the rear-wheel rudder angle δr at that time point.

In other words, the load required for the ARS actuator 400 in steering the rear wheels changes depending on the state of the vehicle 10. For example, in a high vehicle-speed area, the friction between the rear wheels and a road surface decreases. Thus, basically, the load required for the steering of the rear wheels becomes small. In this case, it is possible to set the reference deviation Δδrth to be relatively large and to reduce a frequency at which the electric power supply is cut. This is the same for the rear-wheel rudder angle δr and the lateral acceleration Gy. As each of the rear-wheel rudder angle δr and the lateral acceleration Gy increases, it has a higher load. Thus, it is possible to set the reference deviation Δδrth to be relatively small.

Each quantity of state is one example of the "quantity of state of the vehicle" of the present invention. The correspondence relation between each quantity of state and the reference deviation Δδrth may be determined such that the waste or consumption of the battery can be avoided certainly while the effects of the rear-wheel steering are maintained as much as possible, on the basis of experiments, experiences, theories, simulations or the like in advance.

<Second Embodiment>

In the first embodiment, the waste of electric power is avoided by cutting the electric power supply to the ARS actuator 400. The electric power saving effect can be also realized under another control aspect. Hereinafter, ARS electric power saving control in a second embodiment will be explained. Incidentally, the ARS electric power saving control in the second embodiment is the same as the ARS electric power saving control in the first embodiment illustrated in FIG. 3 in many parts. Here, the explanation will be given with reference to the aforementioned FIG. 3. Incidentally, the vehicle structure in the second embodiment is assumed to be the same as in the first embodiment.

In the ARS electric power saving control in the second embodiment, if the judgment conditions in the step S102 are satisfied (the step S102: YES), the ECU 100 sets the target rear-wheel rudder angle δrtg at that time point as the rear-wheel rudder angle δr instead of the rear-wheel rudder angle δr detected by the rudder angle sensor 19.

If ending the process of replacing the rear-wheel rudder angle δr, the ECU 100 continues the normal drive control of the ARS actuator 400. In other words, in this case, since the rudder angle deviation Δδr is zero, the driving force which wastes the electric power resources is no longer supplied from the ARS 400, and the consumption of electric power resources accumulated in the battery is reduced and saved, preferably.

<Third Embodiment>

The same effect as in the second embodiment can be also realized by using yet another control. Now, as a third embodiment of the present invention, such ARS electric power saving control will be explained. Incidentally, the ARS electric power saving control in the third embodiment is the same as the ARS electric power saving control in the first embodiment illustrated in FIG. 3 in many parts. Here, the explanation will be given with reference to the aforementioned FIG. 3. Incidentally, the vehicle structure in the third embodiment is assumed to be the same as in the first embodiment.

In the ARS electric power saving control in the third embodiment, if the judgment conditions in the step S102 are satisfied (the step S102: YES), the ECU 100 sets an offset rudder angle δrofs corresponding to the rudder angle deviation Δδr at that time point. The offset rudder angle δrofs is one example of the "offset angle" of the present invention. If setting the offset rudder angle δrofs as described above, the ECU 100 adds the set offset rudder angle δrofs to the rear-wheel rudder angle δr, thereby updating the rear-wheel rudder angle δr. As a result, as in the second embodiment, the rudder angle deviation Δδr becomes zero, and taking out the driving force from the battery is suppressed. Incidentally, the offset rudder angle δrofs is not necessarily a value corresponding to the rudder angle deviation Δδr.

Incidentally, in the third embodiment, if the target rear-wheel rudder angle δrtg increases (i.e. if a request to steer in the rudder angle end direction is occurred further), the offset rudder angle δrofs may be increased in accordance with the amount of the increase in the target rear-wheel rudder angle δrtg. In this manner, feedback control according to the rudder angle deviation Δδr can be set in a convergence state all the time, and taking out the electric power meaninglessly from the battery is avoided certainly.

On the other hand, in the third embodiment, it is also possible to reduce (or release) the offset rudder angle δrofs according to circumstances. In other words, as described above regarding the rudder angle deviation Δδr, depending on the quantity of state of the vehicle 10 (e.g. the vehicle speed V, the rear-wheel rudder angle δr and the lateral acceleration Gy), the load on the ARS actuator 400 side required for the steering of the rear wheels increases or decreases. By using this point, for example, in the high vehicle-speed area, the offset rudder angle δrofs may be reduced. At this time, timing to reduce the offset rudder angle δrofs may be further variable, and a speed to reduce the offset rudder angle δrofs may be further variable.

Moreover, in the same manner, if the target rear-wheel rudder angle δrtg is less than the rear-wheel rudder angle δr (e.g. if the judgment condition in the step S104 is satisfied) or in similar cases, it is possible to judge that there is no need for the electric power saving. Even in this case, the offset rudder angle δrofs may be reduced. Incidentally, in this case, since the ARS actuator 400 can perform the normal rear-wheel steering control, desirably, the offset rudder angle δrofs may be also zero.

The present invention is not limited to the aforementioned embodiments, but various changes may be made, if desired, without departing from the essence or spirit of the invention which can be read from the claims and the entire specification. A control apparatus of a rear-wheel steering apparatus, which involves such changes, is also intended to be within the technical scope of the present invention.

Industrial Applicability

The present invention can be used to control a rear-wheel steering apparatus capable of steering the rear wheels of a vehicle.

The invention claimed is:

1. A control apparatus of a rear-wheel steering apparatus, the rear-wheel steering apparatus comprising:

a steering force supplying device capable of supplying rear wheels of a vehicle with a steering force for promoting steering of the rear wheels in accordance with an electrification state; and an electrifying device capable of controlling the electrification state, said control apparatus comprising:

a target rudder angle setting device for setting a target rudder angle of the rear wheels;

an actual rudder angle specifying device for specifying an actual rudder angle of the rear wheels; and an electrification controlling device for controlling the electrifying device such that the steering force is supplied on the basis of a deviation between the set target rudder angle and the specified actual rudder angle, and for controlling the electrifying device such that electric power supply to the steering force supplying device is cut if the specified actual angle is greater than or equal to a reference rudder angle and if the deviation is greater than or equal to a reference deviation.

2. The control apparatus of the rear-wheel steering apparatus according to claim 1, wherein the steering force supplying device is an actuator in which backward efficiency is less than forward efficiency.

3. The control apparatus of the rear-wheel steering apparatus according to claim 1, wherein said electrification controlling device restarts the electric power supply if the deviation is less than a predetermined deviation for return in a state that the electric power supply is cut.

4. A control apparatus of a rear-wheel steering apparatus, the rear-wheel steering apparatus comprising:

a steering force supplying device capable of supplying rear wheels of a vehicle with a steering force for promoting steering of the rear wheels in accordance with an electrification state; and an electrifying device capable of controlling the electrification state, said control apparatus comprising:

a target rudder angle setting device for setting a target rudder angle of the rear wheels;

an actual rudder angle specifying device for specifying an actual rudder angle of the rear wheels;

an electrification controlling device for controlling the electrifying device such that the steering force is supplied on the basis of a deviation between the set target rudder angle and the specified actual rudder angle; and an actual rudder angle setting device for setting the set target rudder angle as an actual rudder angle for defining the deviation if the specified rudder angle is greater than or equal to a reference rudder angle and if the deviation is greater than or equal to a reference deviation.

5. A control apparatus of a rear-wheel steering apparatus, the rear-wheel steering apparatus comprising:

a steering force supplying device capable of supplying rear wheels of a vehicle with a steering force for promoting steering of the rear wheels in accordance with an electrification state; and an electrifying device capable of controlling the electrification state, said control apparatus comprising:

a target rudder angle setting device for setting a target rudder angle of the rear wheels;

an actual rudder angle specifying device for specifying an actual rudder angle of the rear wheels;

an electrification controlling device for controlling the electrifying device such that the steering force is supplied on the basis of a deviation between the set target rudder angle and the specified actual rudder angle; and an offset angle setting device for setting an offset angle to be added to the specified actual rudder angle in accordance with the deviation if the specified rudder angle is greater than or equal to a reference rudder angle and if the deviation is greater than or equal to a reference deviation, said electrifying device controlling the electrifying device on the basis of the set target rudder angle and a modified rudder angle obtained by adding the set offset angle to the specified actual rudder angle.

6. The control apparatus of the rear-wheel steering apparatus according to claim 4, further comprising a reference deviation setting device for setting the reference deviation in accordance with predetermined quantity of state of the vehicle.

7. The control apparatus of the rear-wheel steering apparatus according to claim 6, wherein the predetermined quantity of state of the vehicle includes at least one of a speed of the vehicle, the actual rudder angle of the rear wheels, and lateral acceleration of the vehicle.

8. The control apparatus of the rear-wheel steering apparatus according to claim 5, wherein said offset angle setting device increases the offset angle in accordance with amount of an increase if the set target rudder angle increases.

9. The control apparatus of the rear-wheel steering apparatus according to claim 5, wherein said offset angle setting device reduces the offset angle in accordance with amount of an increase if the set target rudder angle increases.

10. The control apparatus of the rear-wheel steering apparatus according to claim 5, wherein said offset angle setting device reduces the set offset angle if the set target rudder angle is less than the specified actual rudder angle.

11. The control apparatus of the rear-wheel steering apparatus according to claim 1, wherein said target rudder angle setting device sets the target rudder angle on the basis of predetermined quantity of state of the vehicle or a driver's steering amount.

12. The control apparatus of the rear-wheel steering apparatus according to claim 2, wherein said electrification controlling device restarts the electric power supply if the deviation is less than a predetermined deviation for return in a state that the electric power supply is cut.

13. The control apparatus of the rear-wheel steering apparatus according to claim 5, further comprising a reference deviation setting device for setting the reference deviation in accordance with predetermined quantity of state of the vehicle.

14. The control apparatus of the rear-wheel steering apparatus according to claim 4, wherein said target rudder angle setting device sets the target rudder angle on the basis of predetermined quantity of state of the vehicle or a driver's steering amount.

15. The control apparatus of the rear-wheel steering apparatus according to claim 5, wherein said target rudder angle setting device sets the target rudder angle on the basis of predetermined quantity of state of the vehicle or a driver's steering amount.

* * * * *